W. CROASDALE.
Seed-Planter.
No. 6,908.
Patented Nov. 27, 1849.
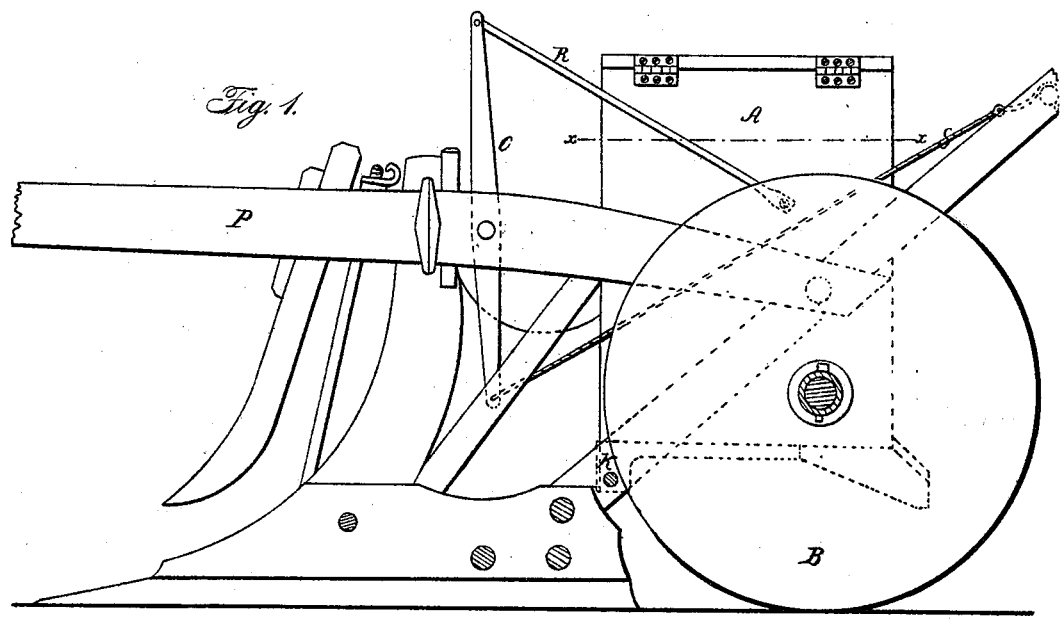
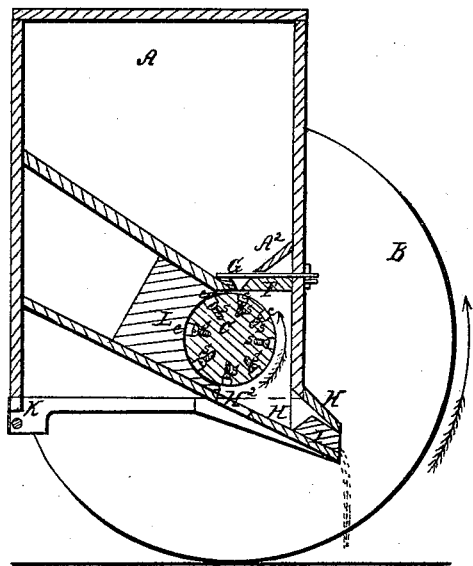
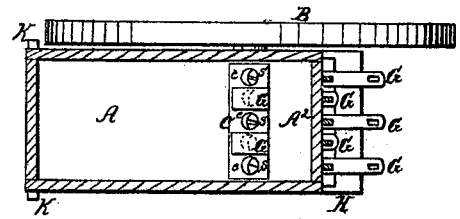

UNITED STATES PATENT OFFICE.

WILLIAM CROASDALE, OF HARTSVILLE, PENNSYLVANIA.

IMPROVEMENT IN COMBINED PLOW AND SEED-PLANTER.

Specification forming part of Letters Patent No. 6,908, dated November 27, 1849.

*To all whom it may concern:*

Be it known that I, WILLIAM CROASDALE, of Hartsville, Bucks county, and State of Pennsylvania, have invented a new and useful improvement, being a seeding apparatus attached to a common single-furrow plow, for planting grain, seed, &c., at the first or second plowing, and for other purposes, which is described as follows, reference being had to the annexed drawings of the same, making part of this specification.

Figure 1 is a side elevation of a common plow and the planting apparatus attached thereto. Fig. 2 is a vertical longitudinal section of the planting apparatus, detached from the plow, showing the hopper, slides, perforated bottom, planting-cylinder, concave inclined spout, and removable section of its bottom, connecting-round and propelling-wheels. Fig. 3 is a horizontal section on the line $x\ x$ of Fig. 1, showing three of the valves drawn out from over the receptacles for the seed, and the remainder shoved into their respective places.

Similar letters in the several figures refer to corresponding parts.

The nature of my invention and improvement consists in so constructing a feeding apparatus (without the usual frame, handles, beam, cultivator, and tubular teeth, coverers, &c.) as to become an attachment of a common single-furrow plow, by which the seed can be sown simultaneously with the first or second plowing, and by which the expense of one plowing is saved and the apparatus adapted to stony, stumpy, and other rough land, where the ordinary wheeled seeding-machine, containing a combination of cylinders and tubular teeth, cannot be used, and by which the larger and expensive machinery now employed as a separate machine can be dispensed with, thus greatly reducing the expenses of the farmer and producing an agricultural implement which can be more extensively used in cultivating new and old lands, the cost of which being within the means of farmers of very limited circumstances, independently of the novel construction and easy management of the apparatus.

This apparatus is designed to be attached to a common single-furrow or other plow, for sowing seed and grain—such as rye, wheat, oats, broom-corn, barley, ruta-baga, carrots, sugar-beet—and also for dropping corn and seed at given distances apart, or in hills, at the first plowing, or at the time of furrowing out the ground, the planting and sowing part of the machine being attached to the tail end of a plow of the common construction, adapted for the first or second plowing in prairie and and other land.

This planting apparatus consists of a box, A, containing the planting-cylinder, &c., hereinafter described, attached to the rear part of a plow, resting upon a wheel, B, whose axis is coincident with that of the seeding-cylinder, and whose axle turns in bearings in the box, or in a frame attached thereto, or in any convenient way, said wheel turning in the furrow made by the plow, or by the side thereof, and actuating the planting cylinder or roller C by means of the friction of the said wheel B upon the ground.

The planting cylinder or roller C is made in the usual manner, and is placed in the box A below the perforated bottom F of a hopper, $A^2$, formed in the box above the cylinder, for the reception of the grain to be planted. The perforated board F forms the bottom of the hopper, through which the seed passes to the recesses or seed-receivers $c$ in the circumference of the cylinder. Horizontal slides or valves G are arranged over this perforated bottom, and moving upon it, for the purpose of being drawn out or shoved in, so as to open or close a way or passage to the cavities or seed-chambers $c$ in the periphery of the planting-cylinder, according to the kind of planting that may be required to be done. The slides are operated from the side of the box next the handles of the plow.

One-half of the cylinder is surrounded by a concave, L, of the semi-diameter of the cylinder, or nearly so, for the purpose of confining the seed in the cavities of the cylinder until the said cavities are in a position antipodal to the apertures in the bottom of the hopper, when the seed will be discharged into the spout H, or ready to drop from the cavities in the cylinder perpendicularly through an aperture, $H^2$, in the bottom of the spout H, when opened by the removal of a section of its inclined bottom. This section of the bottom of the inclined spout is immediately below the bottom of the cylinder, and is made removable for the purpose of dropping corn and other grain in hills at given distances, said section being removed when such grains and seed are to be planted and restored to its position when other small grains are to be sown, in which case they will pass through the spout. The said section is lettered H².

Below the planting-cylinder is constructed a broad inclined spout, H, the full width of the box, having an inclined gage or stopper, I, in the same, for diminishing the width of the spout, said gage or stopper being removed when the seed is to be sown in rows of the width of the box.

The planting apparatus is attached to the plow by a rod or round, K, passed through the lower front corner of the seed-box, or metallic bearings attached thereto, and through the handles of the plow, so that the box may turn loosely on said rod as the wheel B rises and falls in passing over rough and stony land, secured in any convenient way or manner in order to accomplish the end in view.

Passing the single connecting-rod K transversely and horizontally through the box and handles is a convenient way of attachment, although other modes may be adopted.

Whenever it is required to plant wheat the machine must be attached to the furrowing-plow and the grain to be sown put into the hopper. One of the slides must then be drawn out, so as to uncover a hole in the bottom of the hopper. The team is then driven forward. The friction of the sustaining-wheel B (which follows the plow) upon the ground and in or by the side of the furrow causes the cylinder to revolve, which receives the grain from the hopper in the recesses or cavities c in the same and deposits it into the broad spout H, which spreads it along the furrows. On the return of the plow to make the next parallel furrow the grain that was previously sown will be covered, and so on until the whole field shall be plowed and planted, thus doing away with the necessity of using a separate planting-machine after the plowing is finished, and completing the planting during the operation of furrowing the land, with the aforesaid simple attachment of a box, roller, and wheel, &c., to the ordinary plow.

The machine is adapted to sowing many kinds of seed. The one represented in the drawings will sow five different kinds of seed. The drawing out of one slide will be sufficient for planting one description of seed.

The depths of the apertures c in the planting-cylinder may be diminished or increased by turning the graduating-screws s, as is generally practiced in such cylinders, in order to adapt the cylinder to planting various kinds of seed.

When the seed is to be sown in rows the inclined guide I must be inserted in the spout in such position as to direct the seed or grain to either side of the spout, so as to cause it to drop into the furrow made by the plow. One revolution of the wheel will cause one revolution of the cylinder.

The seed-apertures c in the periphery of the cylinder are arranged in circles around it, and are provided with screws, so that more or less of said apertures may be opened or closed at pleasure, according to the distance apart of the required planting, by simply turning the screws to the right or to the left.

Any required circle of seed-chambers may be used by drawing out the slide immediately over the same; and should one chamber c of the circle be required to be used the rest must be closed by turning the screws till their heads are coincident with the periphery of the cylinder.

In turning the plow the wheel of the planting apparatus may be raised from the ground by drawing a cord attached to one end of a lever whose fulcrum is a pin inserted into the side of the plow-beam, its other end being attached to the seed-box by a strap, by which it is turned on the axle K and held in any required position by attaching the cord to one of the rounds of the plow.

A harrow or other suitable drag for covering the seed may be attached to the plow in any convenient way or manner.

A scraper may be attached to the box for scraping the dirt from the periphery of the propelling-wheel.

This machine may be adapted to the planting of potatoes by a slight modification.

When this seeding apparatus is used to sow the seed simultaneously with the operation of the first plowing, in order to dispense with the necessity of the second plowing, the box A must be attached to the plow by the rod K, in the manner above described.

When the sowing is not required to be performed at the first plowing the seeding apparatus must be detached from the plow; and when the planting or seeding is required to be performed simultaneously with the second plowing, which is done by the same plow, the seeding-box must be attached to it in the same manner as above described. In each case the motion of the planting-cylinder is arrested, if required, while the plowing is progressing or while turning the team and plow, by raising the wheel from the ground, which is effected by turning the seed-box on its axis in an arc of a circle by simply drawing the cord, as above described.

Having thus described the nature of my invention and pointed out the manner of using the same, and shown that by its peculiar construction and use in combination with a common single-furrow plow that one plowing of the ground is saved, I hereby declare that I do not claim any of the individual parts of the plow and seeding apparatus; but

What I do claim as my invention, and desire to secure by Letters Patent, is—

The construction of the seed-planter, as described, consisting of a seeding apparatus combined with a single-furrow plow, as described, so as to sow the grain at the first or second plowing, in the manner and for the purpose herein fully set forth.

In testimony whereof I have hereunto signed my name, before two subscribing witnesses, this 17th day of August, 1848.

WILLIAM CROASDALE.

Witnesses:
    WM. P. ELLIOT,
    L. WASHINGTON, Sr.